United States Patent
Yen et al.

(10) Patent No.: US 12,538,041 B2
(45) Date of Patent: Jan. 27, 2026

(54) IMAGE CAPTURING APPARATUS

(71) Applicant: GUANGZHOU LUXVISIONS INNOVATION TECHNOLOGY LIMITED, Guangzhou (CN)

(72) Inventors: Shih-Chieh Yen, Guangzhou (CN); Erh-Wen Lan, Guangzhou (CN)

(73) Assignee: GUANGZHOU LUXVISIONS INNOVATION TECHNOLOGY LIMITED, Guangzhou (CN)

( * ) Notice: Subject to any disclaimer, the term of this patent is extended or adjusted under 35 U.S.C. 154(b) by 0 days.

(21) Appl. No.: 19/007,170

(22) Filed: Dec. 31, 2024

(65) Prior Publication Data

US 2025/0386107 A1    Dec. 18, 2025

(30) Foreign Application Priority Data

Jun. 18, 2024    (CN) .......................... 202410793270.6

(51) Int. Cl.
*H04N 23/95*    (2023.01)
*H04N 25/13*    (2023.01)

(52) U.S. Cl.
CPC ............. *H04N 23/95* (2023.01); *H04N 25/13* (2023.01)

(58) Field of Classification Search
CPC .... G02B 27/286; G02B 5/201; G02B 5/3058; G02B 7/006; G02B 5/20; G02B 5/30; G01J 2003/2826; H04N 25/135; H04N 23/55

See application file for complete search history.

(56) References Cited

U.S. PATENT DOCUMENTS 10,694,169 B1 *    6/2020    Topliss ...................... G06T 7/70
2013/0270421 A1 *    10/2013    Kanamori .............. G02B 5/201
250/208.1

(Continued)

FOREIGN PATENT DOCUMENTS

WO    WO-2021103872 A1 *    6/2021    ............. H04N 23/54

OTHER PUBLICATIONS

"Material Detection with a CCD Polarization Imager"—Gruev et al., 2010 IEEE 39th Applied Imagery Pattern Recognition Workshop (AIPR); Oct. 13-15, 2010. (Year: 2010).*

(Continued)

*Primary Examiner* — Mainul Hasan
(74) *Attorney, Agent, or Firm* — Birch, Stewart, Kolasch & Birch, LLP

(57) ABSTRACT

An image sensor includes a plurality of sensing modules. The plurality of sensing modules are arranged in an arrayed manner. Each of the sensing modules includes a plurality of polarization elements, a plurality of optical filtering elements, a plurality of first photodiodes, and a plurality of second photodiodes. The plurality of polarization elements have polarization directions respectively, and the polarization directions of the polarization elements are different. The plurality of optical filtering elements are adjacent to the plurality of polarization elements respectively, and each of the optical filtering elements allows light with different wavelengths to pass through. Each of the first photodiodes has a first receive end aligned with each of the polarization elements. Each of the second photodiodes has a second receive end aligned with each of color optical filtering elements.

11 Claims, 8 Drawing Sheets

(56) References Cited

U.S. PATENT DOCUMENTS

| | | | | |
|---|---|---|---|---|
| 2015/0296137 A1* | 10/2015 | Duparre | ............... | G02B 13/004 |
| | | | | 348/48 |
| 2021/0175270 A1* | 6/2021 | Pang | ................... | H10F 39/8023 |
| 2021/0203872 A1* | 7/2021 | Chen | ..................... | G01B 11/24 |
| 2022/0247992 A1* | 8/2022 | Chen | ..................... | G01S 17/894 |
| 2023/0314681 A1* | 10/2023 | Wang | ..................... | H10F 39/18 |
| | | | | 257/432 |

OTHER PUBLICATIONS

"A Low Cost Polarized Navigation Sensor Design"—Yang et al., International Conference on "Computational Intelligence and Communication Technology" (CICT 2018); Feb. 9-10, 2018. (Year: 2018).*

"Spectral-Polarization Imaging with CMOS-Metallic Nanowires Sensor"—Gruev et al., 978-1-4577-0733-9/12/$26.00 Â© 2012 IEEE. (Year: 2012).*

\* cited by examiner

IMAGE CAPTURING APPARATUS

CROSS-REFERENCE TO RELATED APPLICATION

This non-provisional application claims priority under 35 U.S.C. § 119 (a) to patent application No. 202410793270.6 filed in China on Jun. 18, 2024, the entire contents of which are hereby incorporated by reference.

BACKGROUND

Technical Field

The present invention relates to an image sensor, and in particular, to an image sensor integrated into an image capturing apparatus.

Related Art

In many application scenarios such as virtual reality (VR), enhanced reality (AR), self-driving driving, a man-machine interaction, or three-dimensional imaging, there is a need to obtain both color images and depth information.

For example, in a self-driving application, when a surrounding environment is photographed, a distance between objects in the environment can be sensed, so that a self-driving system can accurately understand the surrounding environment and make a corresponding decision based on an image of the environment and depth information in the image. Specifically, the self-driving system may obtain a surrounding image in a real-time manner, and perform image identification and distance determining on content in the image. When a pedestrian or an obstacle is identified, the self-driving system may make a response in a timely manner based on a determined distance.

Second, in both virtual reality (VR) and enhanced reality (AR) applications, implementation of richer interaction experience may be facilitated if both color image information and depth information can be obtained.

In terms of a current technology commonly used, to obtain both the image information and the depth information, an image sensor is generally integrated with an additional depth sensing technology, for example, combining the image sensor with structural light and a time of flight (ToF). However, during integration of the image sensor and the additional depth sensing technology, problems may be encountered, such as relatively high costs during integration, integrated complexity, or a degradation of quality image obtained due to integration of the additional depth sensing technology.

SUMMARY

In view of this, the present invention provides an image sensor, including a plurality of sensing modules arranged in an arrayed manner. Each of the sensing modules includes a plurality of polarization elements, a plurality of optical filtering elements, a plurality of first photodiodes, and a plurality of second photodiodes. The plurality of polarization elements have polarization directions respectively, and the polarization directions of the polarization elements are different. The plurality of optical filtering elements are adjacent to the polarization elements respectively, and each of the optical filtering elements allows light with different wavelengths to pass through. A quantity of the first photodiodes corresponds to a quantity of the polarization elements, and each of the first photodiodes has a first receive end aligned with each of the polarization elements. A quantity of the second photodiodes corresponds to a quantity of the optical filtering elements, and each of the second photodiodes has a second receive end aligned with each of the optical filtering elements.

In an embodiment, the quantity of the polarization elements is four, and polarization angles of the polarization elements are 0°, 45°, 90°, and 135° respectively.

In an embodiment, the optical filtering elements include at least one red light optical filtering element, at least one green light optical filtering element, and at least one blue light optical filtering element.

In an embodiment, the optical filtering elements are arranged alternately with the polarization elements, respectively.

In an embodiment, the optical filtering elements are respectively located around the polarization elements.

In an embodiment, the sensing module further includes a plurality of lenses, where each of the lenses is disposed on the other side of each of the polarization elements relative to each of the first photodiodes and on the other side of each of the optical filtering elements relative to each of the second photodiodes.

In an embodiment, the sensing module further includes a plurality of bases, the first photodiodes and the second photodiodes are respectively disposed in the bases, the first receive end of each of the first photodiodes and the second receive end of each of the second photodiodes are exposed to each of the bases, the first photodiodes each have a first signal end relative to the first receive end, the second photodiode each have a second signal end relative to the second receive end, and the first signal end and the second signal end are respectively disposed in the base.

In an embodiment, each of the first photodiodes receives, by using the first receive end, polarization light passing through each of the polarization elements, and each of the second photodiodes receives, by using the second receive end, color light passing through each of color optical filtering elements.

The present invention further provides an image capturing apparatus, including an image sensor, a first processing module, and a second processing module. The first processing module is electrically connected to first photodiodes, and is configured to analyze a plurality of polarization signals obtained by receiving polarization light by the first photodiodes, to obtain depth information. The second processing module is electrically connected to second photodiodes, and is configured to analyze a plurality of color signals obtained by receiving color light by the second photodiodes, to obtain image information.

In an embodiment, light passes through each of polarization elements from an exterior of the image sensor to form the polarization light.

In an embodiment, light passes through each of optical filtering elements from an exterior of the image sensor to form the color light.

In an embodiment, a processor is further included, and is electrically connected to the first processing module and the second processing module, where the processor is configured to process the depth information and the image information to generate a three-dimensional image.

DETAILED DESCRIPTION

The following describes the present invention in detail with reference to the accompanying drawings and specific embodiments, but is not intended to limit the present invention.

Figure 1:
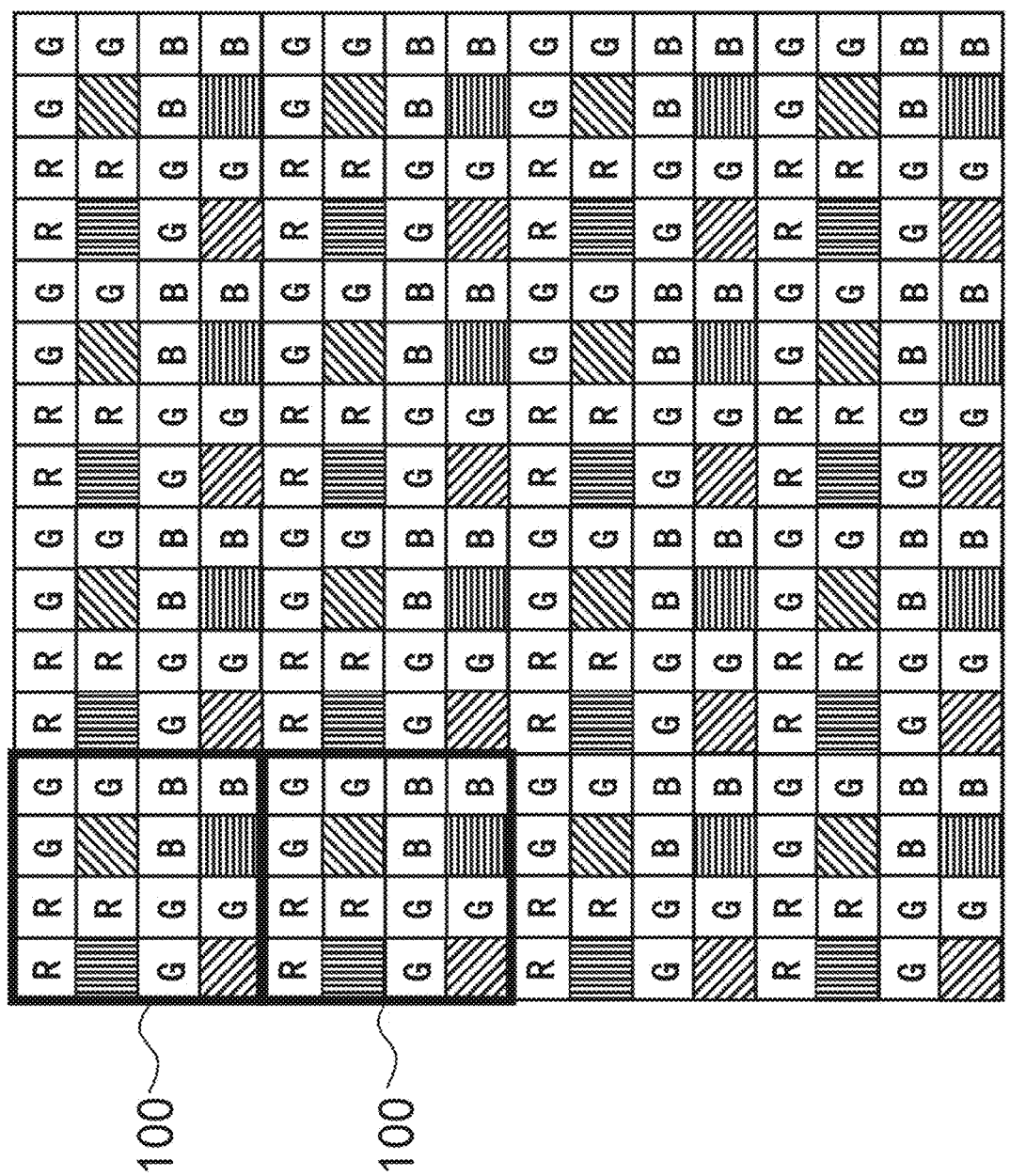
FIG. 1 is a schematic top view of an image sensor according to an embodiment.
Figure 2:
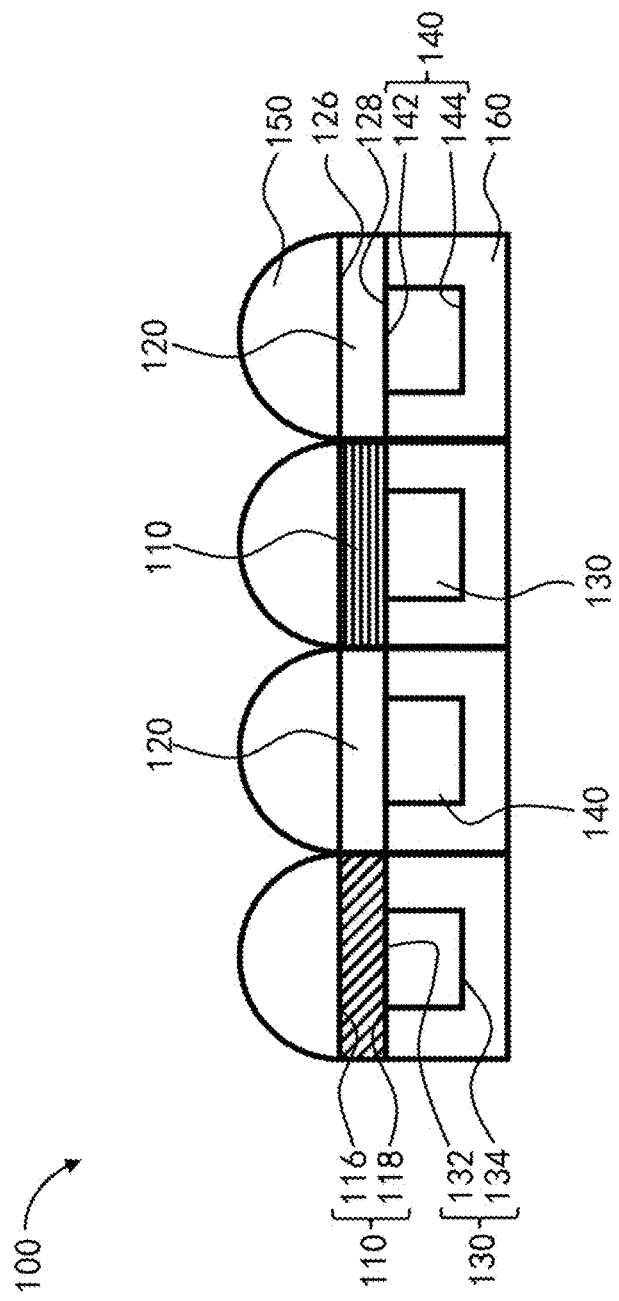
FIG. 2 is a side view of a sensing module according to an embodiment.

FIG. 1 is a schematic top view of an image sensor according to an embodiment. FIG. 2 is a side view of a sensing module according to an embodiment. Please refer to FIG. 1 and FIG. 2. The image sensor 10 includes a plurality of sensing modules 100. The sensing modules 100 are arranged in an arrayed manner. Each of the sensing modules 100 includes a plurality of polarization elements 110, a plurality of optical filtering elements 120, a plurality of first photodiodes 130, and a plurality of second photodiodes 140. The polarization elements 110 have polarization directions respectively, and the polarization directions of the polarization elements 110 are different. The plurality of optical filtering elements 120 are adjacent to the polarization elements 110 respectively, and each of the optical filtering elements 120 allows light with different wavelengths to pass through.

A quantity of the first photodiodes 130 in the sensing module 100 corresponds to a quantity of the polarization elements 110, and a quantity of the second photodiodes 140 corresponds to a quantity of the optical filtering elements 120. The first photodiode 130 has a first receive end 132, and the first receive end 132 of the first photodiode 130 is aligned with the polarization element 110. The second photodiode 140 has a second receive end 142, and the second receive end 142 of the second photodiode 140 is aligned with the optical filtering element 120.

In some embodiments, the first photodiode 130 and the second photodiode 140 are implemented by photodiodes in a same type. For example, both the first photodiode 130 and the second photodiode 140 may be a PIN photodiode (P-intrinsic-N Photodiode).

Figure 3:
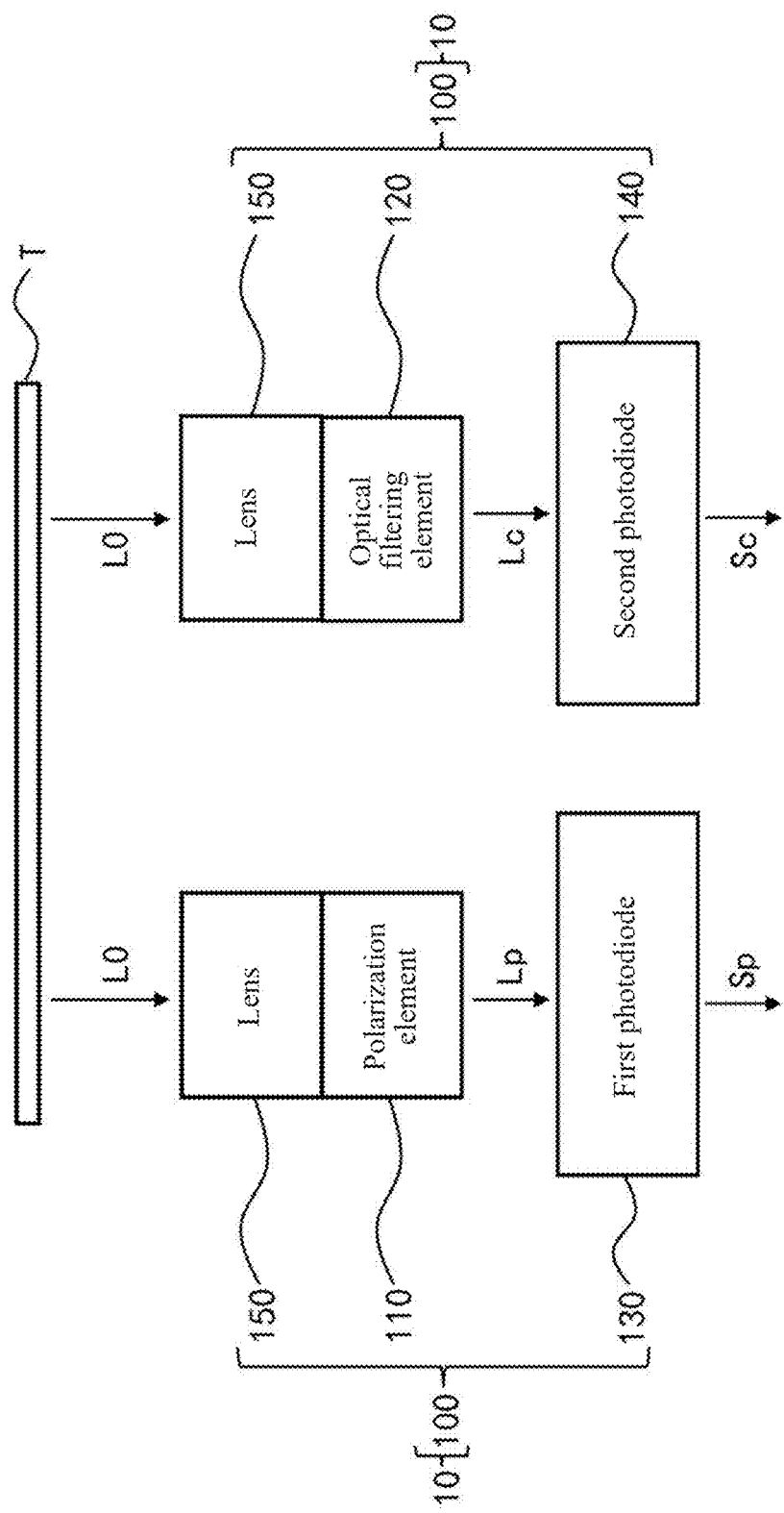
FIG. 3 is a schematic diagram of light entering an image sensor according to an embodiment.

FIG. 3 is a schematic diagram of light entering an image sensor according to an embodiment. Please refer to FIG. 3. A first photodiode 130 and a second photodiode 140 may absorb light L0 from an exterior of a sensing module 100, generate a corresponding current, and convert the current into an electrical signal, so that the sensing module 100 can convert the light L0, captured from the exterior, into a polarization signal Sp with polarization information or a color signal Sc with image color information.

One end of the first photodiode 130 and one end of the second photodiode 140 that are used to receive the light L0 is a first receive end 132 and a second receive end 142 respectively. Before entering the first receive end 132 or the second receive end 142, the light L0 first passes through a polarization element 110 or an optical filtering element 120. The polarization element 110 filters the light L0, so that the light L0 received by the first photodiode 130 is polarization light Lp, and the optical filtering element 120 causes the light L0 received by the second photodiode 140 to be color light Lc.

In some embodiments, the image sensor 10 can be configured to capture an image of a target T outside the image sensor 10. The polarization signal Sp generated after the image sensor 10 receives the polarization light Lp by using the first photodiode 130 may be used to obtain depth information Id (see FIG. 10) of a photographed target T. The color signal Sc generated after the image sensor 10 receives the color light Lc by using the second photodiode 140 may be used to obtain image information Ii of the photographed target T (see FIG. 10).

Specifically, light reflected by a surface of the target T photographed by using an image capturing apparatus has light polarization characteristics, including a polarization degree, a polarization angle, and the like. The polarization characteristics have a correspondence with a contour feature of the surface of the target T, that is, information about the polarization characteristics of the light reflected by the surface of the target T is obtained, so that a distance and a depth can be calculated on the surface of the target T, to obtain the depth information Id of the target T. In the present disclosure, the light L0 passes through the polarization element 110 to form the polarization light Lp, and the polarization signal Sp generated after the first photodiode 130 receives the polarization light Lp has polarization characteristics of the polarization light Lp. After calculation and analysis are performed on the polarization signal Sp, the depth information Id of the target T can be obtained.

On the other hand, the optical filtering element 120 allows a specific band in the light L0 to pass through. In some embodiments, the optical filtering element 120 may be implemented by using a color filter. Because the optical filtering element 120 allows light with only a specific wavelength to pass through, the light L0 after passing through the optical filtering element 120 is color light Lc corresponding to the specific wavelength. After receiving the color light Lc, the second photodiode 140 may generate a corresponding color signal Sc based on a received color band and brightness of the color light Lc, and the color signal Sc may be calculated and analyzed to obtain the image information Ii of the target T. The depth information Id and the image information Ii may be used to perform three-dimensional reconstruction on the photographed target T on an image, thereby forming a three-dimensional image of the target T.

Figures 4, 5, 6:
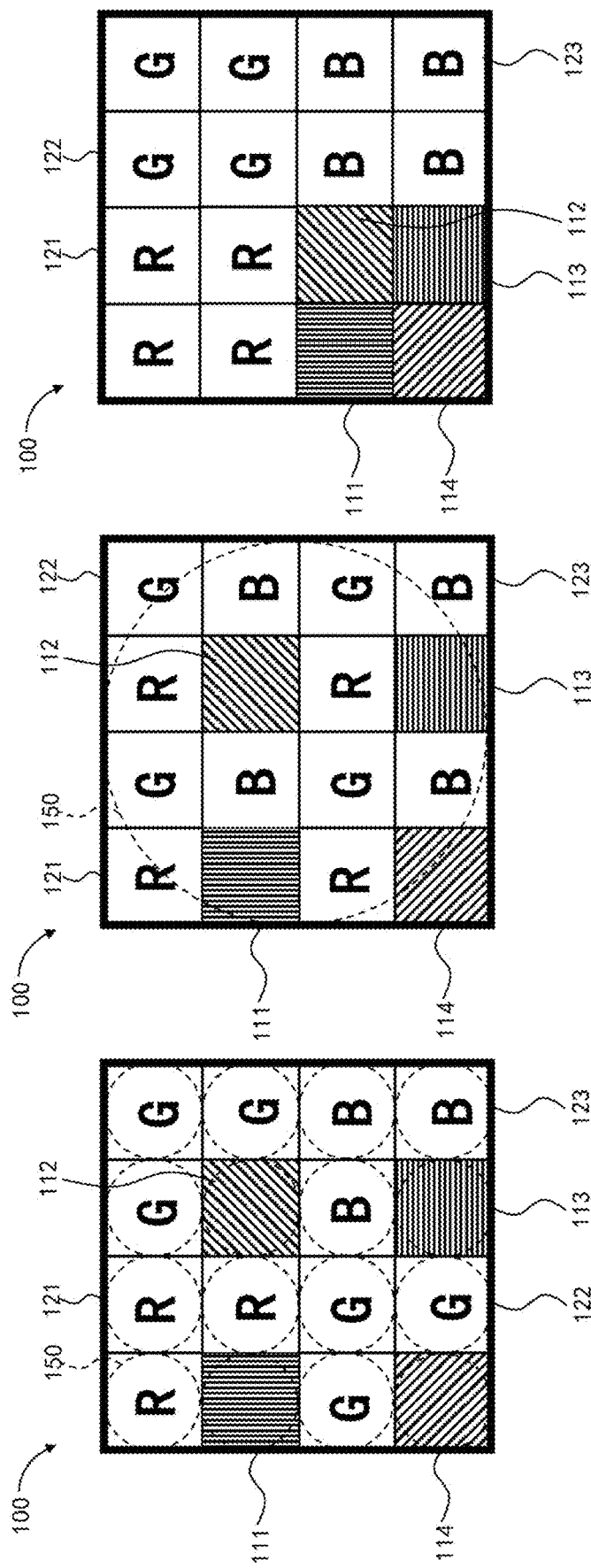
FIG. 4 is a top view of the sensing module in the embodiment in FIG. 2.
FIG. 5 is a top view of a sensing module according to another embodiment.
FIG. 6 is a top view of a sensing module according to still another embodiment.

FIG. 4 is a top view of the sensing module in the embodiment in FIG. 2. Please refer to FIG. 4. Polarization angles of the polarization elements 110 in the sensing module 100 are different. When the light L0 arrives at the polarization element 110, a part that is of the light L0 and that is parallel to the polarization angle of the polarization element 110 can pass through the polarization element 110 (that is, the polarization light Lp is formed). For example, when the polarization element 110 is a horizontal polarizer or a vertical polarizer, only a part that is of the light L0 and whose vibration direction is a horizontal direction can pass through the horizontal polarizer, and only a part whose vibration direction is a vertical direction can pass through the vertical polarizer.

In some embodiments, one sensing module 100 may include two polarization elements 110 with different polarization angles, and the polarization angles of the two polarization elements 110 may be 0° and 90° respectively. When a quantity of polarization elements 110 in one sensing module 100 increases, for example, when the quantity is four, two polarization elements 110 with a polarization angle of 0° and two polarization elements 110 with a polarization angle of 90° may be included.

In some other embodiments, the sensing module 100 includes polarization elements 110 with four polarization angles, and the four polarization angles may be 0°, 45°, 90°, and 135° respectively. When a quantity of polarization elements 110 in the sensing module 100 is four, there may be one 0° polarization element 111, one 45° polarization element 112, one 90° polarization element 113, and one 135° polarization element 114. The first photodiode 130 receives polarization light Lp with the four different angles to generate four polarization signals Sp. The four polarization signals Sp are calculated, so that a piece of depth information Id can be obtained.

Please refer to FIG. 4 again, in some embodiments, the optical filtering element 120 includes at least one red light optical filtering element 121, at least one green light optical filtering element 122, and at least one blue light optical filtering element 123, that is, the optical filtering element 120 can separately allow three primary colors of red light (R), green light (G), and blue light (B) to pass through. In some other embodiments, an optical filtering element 120 of complementary colors such as yellow, blue-green, and purple-red can be added based on a requirement of the image capturing apparatus into which the image sensor 10 is integrated.

FIG. 5 is a top view of a sensing module according to another embodiment. Please refer to FIG. 4 and FIG. 5 together. In some embodiments, optical filtering elements 120 are arranged alternately with polarization elements 110, respectively. The optical filtering elements 120 and the polarization elements 110 in the sensing module 100 may be arranged in an M*N array. For example, when there are 12 optical filtering elements 120 and four polarization elements 110, the optical filtering elements 120 and the polarization elements 110 may be arranged in a 4*4 array. One optical filtering element 120 is separately arranged between the polarization elements 110.

For example, when the sensing module 100 includes four red light optical filtering elements 121, four green light optical filtering elements 122, four blue light optical filtering elements 123, one 0° polarization element 111, one 45° polarization element 112, one 90° polarization element 113, and one 135° polarization element 114, the two red light optical filtering elements 121 and the two green light optical filtering elements 122 are arranged adjacent to each other in a first row of the 4*4 array, the two polarization elements 110 (the 0° polarization element 111 and the 45° polarization element 112 shown in FIG. 5) and the two blue light optical filtering elements 123 are arranged alternately in a second row of the 4*4 array, arrangement is performed in a third row in the similar manner as the first row, and arrangement is performed in a fourth row in the similar manner as the second row.

FIG. 6 is a top view of a sensing module according to still another embodiment. Please refer to FIG. 6. In some embodiments, optical filtering elements 120 are respectively located around the polarization elements 110. As mentioned above, an example in which the sensing module 100 includes four red light optical filtering elements 121, four green light optical filtering elements 122, four blue light optical filtering elements 123, one 0° polarization element 111, one 45° polarization element 112, one 90° polarization element 113, and one 135° polarization element 114 is used. The polarization elements 110 may be arranged adjacent to each other, and then the four red light optical filtering elements 121, the four green light optical filtering elements 122, and the four blue light optical filtering elements 123 are arranged around the four polarization elements 110.

In some embodiments, a manner of arranging the red light optical filtering elements 121, the green light optical filtering elements 122, the blue light optical filtering elements 123, and the polarization elements 110 in the sensing module 100 is not limited, and the foregoing descriptions are merely an example. Further, a ratio of a quantity of red light optical filtering elements 121, to a quantity of green light optical filtering elements 122, to a quantity of blue light optical filtering elements 123 is also not limited. A designer may increase, by increasing a quantity of optical filtering elements 120, a quantity of image pixels (Pixel) that an image sensor 10 may obtain.

Specifically, when the image sensor 10 is integrated into an image capturing apparatus, second photodiodes 140 respectively corresponding to one red light optical filtering element 121, one green light optical filtering element 122, and one blue light optical filtering element 123 may separately provide the image capturing apparatus with color signals Sc of red, green, and blue, so that the image capturing apparatus generates image information Ii of one image pixel.

In some embodiments, first photodiodes 130 respectively corresponding to four polarization angles may generate polarization signals Sp with four angles, so that the image capturing apparatus obtains one piece of depth information Id. The designer may increase a quantity of polarization elements 110 and a quantity of first photodiodes 130 corresponding to the polarization elements 110, to increase a quantity of depth information Id that may be obtained by the image sensor 10.

When the first photodiode 130 receives polarization light Lp and the second photodiode 140 receives color light Lc respectively, to enable the image sensor 10 to receive light L0 for generating an image, the second photodiode 140 sensing the light intensity is not affected by the polarization element 110 when receiving the color light Lc, so that a relatively good color signal Sc can be obtained and the integrity of an image pixel of the image sensor 10 is maintained. In this case, the image sensor 10 may alternatively be integrated into an image capturing apparatus with various photographing requirements.

Figure 7:
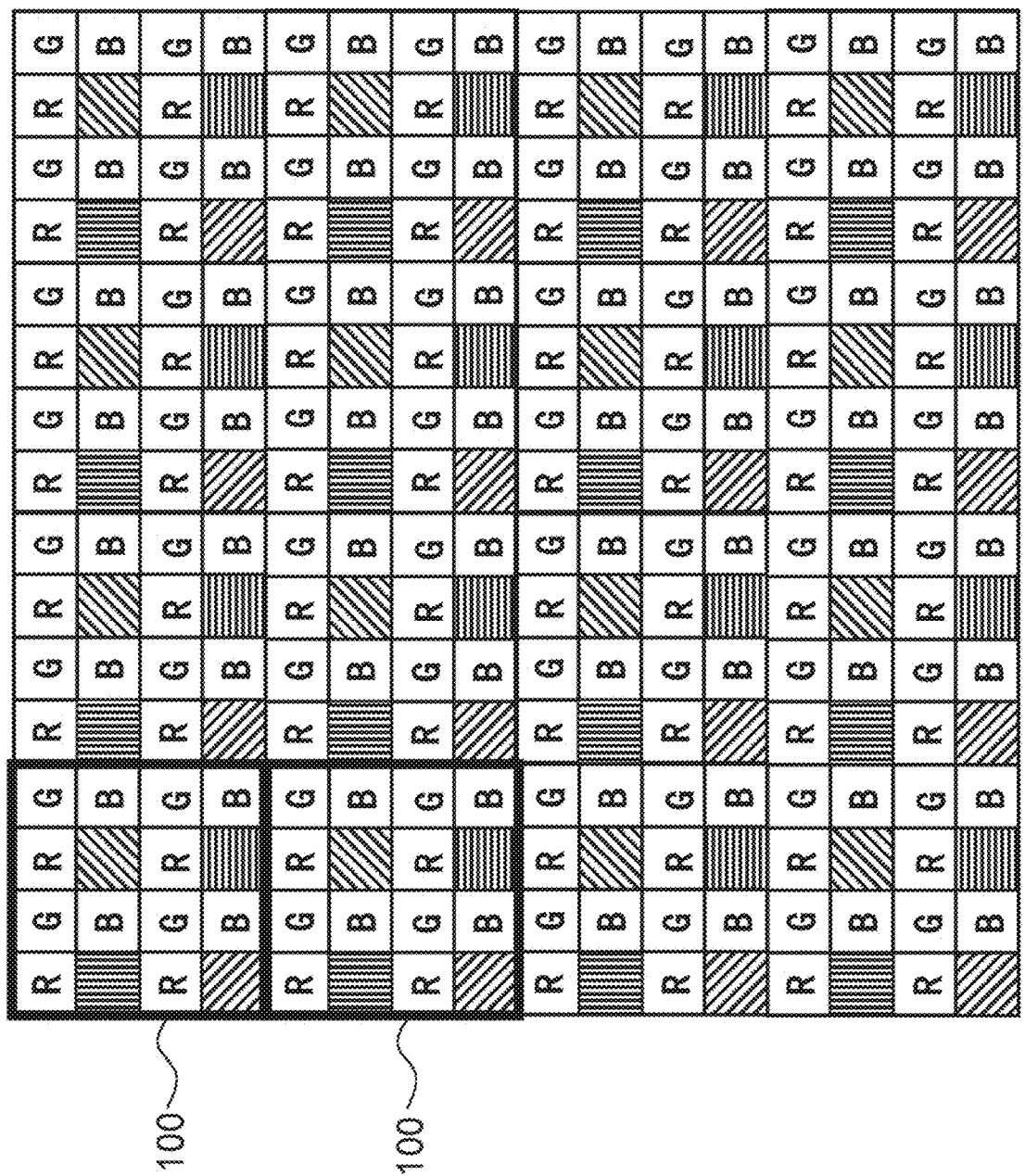
FIG. 7 is a schematic top view of an image sensor according to another embodiment.
Figure 8:
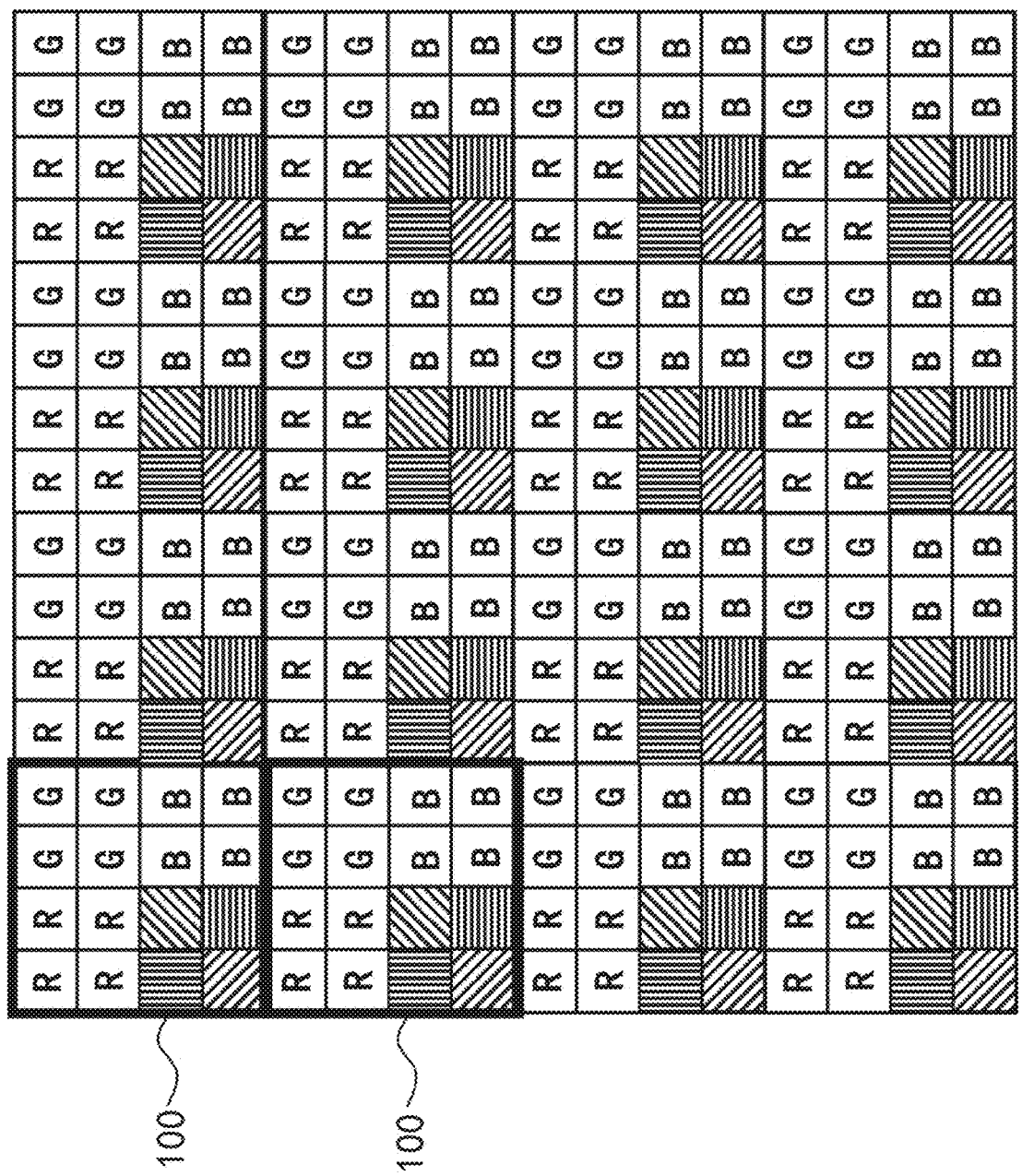
FIG. 8 is a schematic top view of an image sensor according to still another embodiment.

FIG. 7 is a schematic top view of an image sensor according to another embodiment, and FIG. 8 is a schematic top view of an image sensor according to still another embodiment. Please refer to FIG. 7 and FIG. 8 together. In some embodiments, the image sensor 10 includes a plurality of sensing modules 100, and the plurality of sensing modules 100 are arranged in an arrayed manner. A quantity of sensing modules 100 is not limited herein.

Please refer to FIG. 2 and FIG. 4 again, in some embodiments, the sensing module 100 includes a plurality of lenses 150. A quantity of lenses 150 may be equal to a total of a quantity of polarization elements 110 and a quantity of optical filtering elements 120, and one lens 150 corresponds to one polarization element 110 or one optical filtering element 120. A diameter of each lens 150 may correspond to a size of each polarization element 110 and/or a size of each optical filtering element 120, to coincidentally cover the polarization element 110 and/or the optical filtering element 120 respectively.

Each lens 150 may be disposed adjacent to each polarization element 110 or each optical filtering element 120. Each polarization element 110 has a first side 116 and a second side 118 opposite to each other, and the second side 118 faces a first receive end 132 of a first photodiode 130. Each optical filtering element 120 has a front end 126 and a rear end 128 opposite to each other, and the rear end 128 faces a second receive end 142 of a second photodiode 140.

Figure 9:
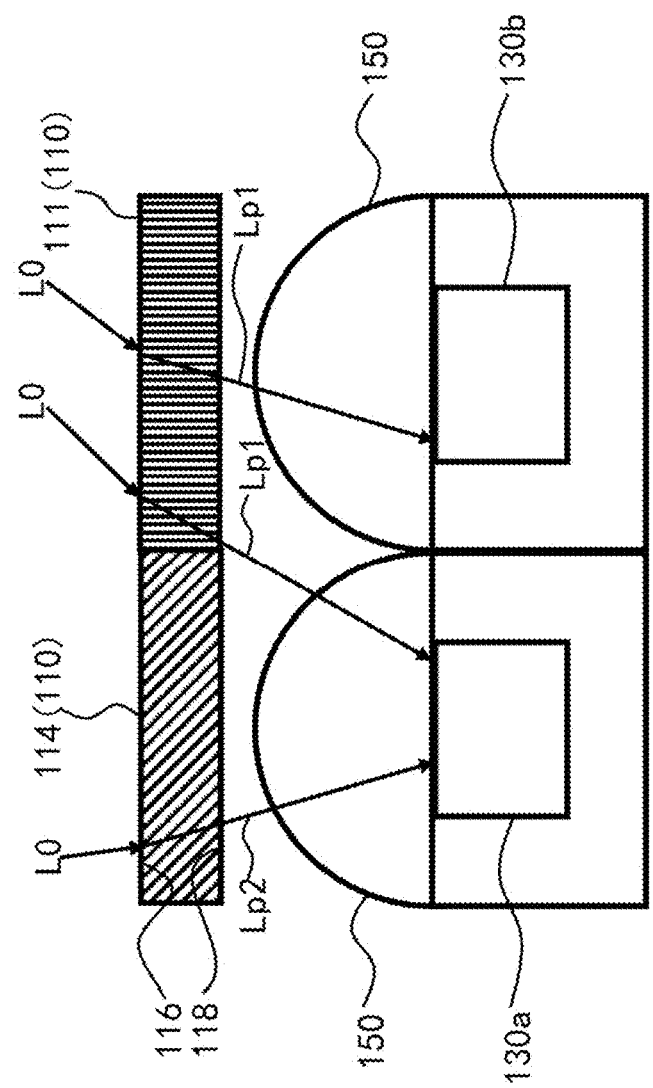
FIG. 9 is a side view of a lens being located on a first side of a polarization element according to an embodiment.

FIG. 9 is a side view of a lens being located on a first side of a polarization element according to an embodiment. Please refer to FIG. 9. In some embodiments, the lens 150 is disposed on the second side 118 of the polarization element 110. As shown in FIG. 9, lenses 150 are respectively disposed on the second side 118 of a polarization element 114 with a polarization angle of 135° and a polarization element 111 with a polarization angle of 0°. Light L0 passes through the polarization element 111 with the 0° polarization angle and is then filtered to be polarization light Lp1 with a polarization angle of 0°, or passes through the polarization element 114 and is then filtered to be polarization light Lp2 with a polarization angle of 135°. Then the polarization light Lp1 and the polarization light Lp2 pass through the lenses 150 and enter first photodiodes 130a and 130b respectively. However, as shown in the figure, in some embodiments, due to an angle at which the light L0 enters an image sensor 10, the first photodiode 130a may receive both the polarization light Lp1 and the polarization light Lp2 with the different polarization angles.

Therefore, in some embodiments, as shown in FIG. 2, the lens 150 is disposed on the first side 116 of the polarization element 110, so that the second side 118 is closer to a first receive end 132 of the first photodiode 130. In this case, a possibility that the first photodiode 130 simultaneously receives polarization light Lp with different polarization angles may be reduced, and an interference caused by the polarization light Lp with the different polarization angles simultaneously entering the first photodiode 130 is avoided.

In some embodiments, the lenses 150 are respectively disposed at the front ends 126 of the optical filtering elements 120, so that a possibility that a second photodiode 140 simultaneously receives color light Lc in different colors.

In the foregoing embodiment in which the sensing module 100 includes the lens 150, the lens 150 may change a refraction direction of the light L0 outside the image sensor 10, and more light L0 is focused onto the first side 116 of the polarization element 110 and the front end 126 of the optical filtering element 120, thereby improving the light focusing property, so that the first photodiode 130 or the second photodiode 140 can receive more optical signals.

Please refer to FIG. 5 again, in some other embodiments, a lens 150 may correspond to a plurality of polarization elements 110 and/or a plurality of optical filtering elements 120. For example, a diameter of the lens 150 may correspond to a size of the sensing module 100, and one lens 150 may cover one sensing module 100.

Please refer to FIG. 2 again, in some embodiments, the sensing module 100 further includes a plurality of bases 160, the first photodiode 130 and the second photodiode 140 are respectively located in the bases 160, and the first receive end 132 of the first photodiode 130 and the second receive end 142 of the second photodiode 140 are exposed from the bases 160.

Figure 10:
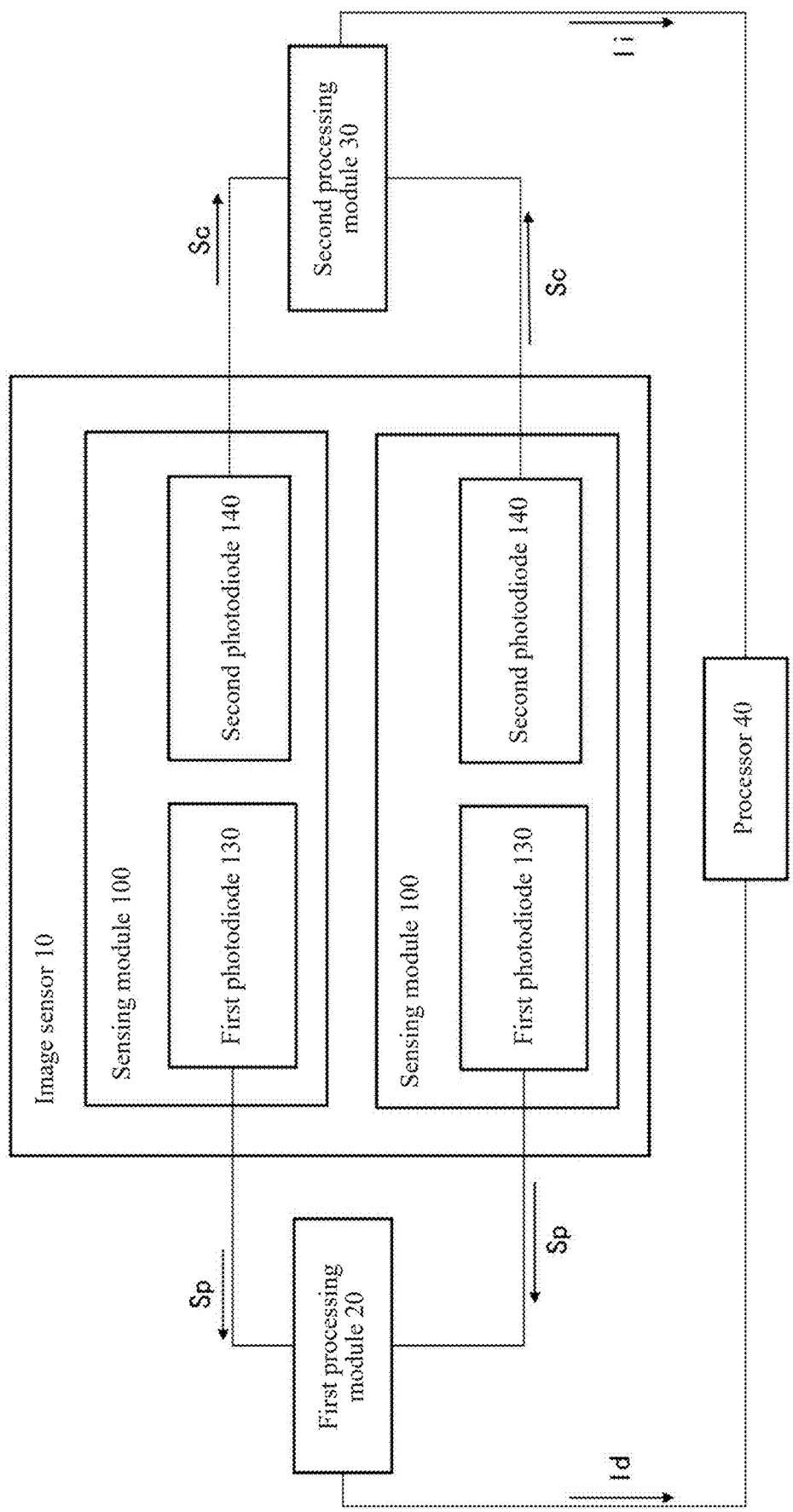
FIG. 10 is a functional block diagram of an image capturing apparatus according to an embodiment.

FIG. 10 is a functional block diagram of an image capturing apparatus according to an embodiment. Please refer to FIG. 10. As mentioned above, an image sensor 10 may be integrated into the image capturing apparatus. Because the image sensor 10 includes both a polarization element 110 and an optical filtering element 120, when the image capturing apparatus obtains image information Ii of a photographed target T (see FIG. 3) by using the image sensor 10, depth information Id of the photographed target T may be obtained simultaneously, that is, the image capturing apparatus needs only one image sensor 10 to meet requirements of a user for obtaining a color image and three-dimensional sensing.

In some embodiments, in addition to the image sensor 10, the image capturing apparatus further includes a first processing module 20 and a second processing module 30. In some embodiments, a first photodiode 130 has a first signal end 134 corresponding to a first receive end 132, and a second photodiode 140 has a second signal end 144 corresponding to a second receive end 142. When the image sensor 10 is integrated into the image capturing apparatus, the first signal end 134 and the second signal end 144 may be electrically connected to, in the base 160, the first processing module 20 and the second processing module 30 in the image capturing apparatus.

In some embodiments, the first processing module 20 is electrically connected to the first signal end 134 of each first photodiode 130. The first photodiode 130 generates polarization signals Sp after receiving polarization light Lp by using the first receive end 132. The polarization signals Sp are transmitted to the first processing module 20. The first processing module 20 analyzes the polarization signals Sp to obtain depth information Id of the photographed target T.

After receiving the polarization light Lp, the first photodiode 130 converts a received optical signal into an electrical signal to obtain the polarization signal Sp. A plurality of polarization signals Sp form depth information Id of a photographed target T carrying light polarization angle information.

After obtaining the polarization signal Sp, the first processing module 20 first segments an image composed of the polarization signals Sp, to distinguish between a foreground (in other words, the photographed target T) area and a background area in the image, and then separately calculates polarization features of the foreground area and the background area. The polarization features may include a degree of linear polarization (DOLP), an azimuth of linear polarization (AOLP), the polarization intensity, and the like. Then, the first processing module 20 obtains a normal vector of a surface of the photographed target T based on the polarization features, and then constructs the depth information Id of the photographed target T based on the normal vector.

In some embodiments, the first processing module 20 may be implemented by a digital signal processor (DSP).

In some embodiments, the second processing module 30 is electrically connected to each second photodiodes 140. The second photodiode 140 generates color signals Sc after receiving color light Lc by using the second receive end 142. The color signals Sc are transmitted to the second processing module 30 through the second signal end 144. The second processing module 30 analyzes the color signals Sc to obtain image information Ii.

In some embodiments, after receiving the color signals Sc, the second processing module 30 may denoise the color signals Sc to reduce noise that may be introduced by the second photodiode 140 when receiving the color light Lc, then demosaics, performs color correction on, performs a brightness adjustment or a contrast ratio enhancement on, sharpens, and the like the plurality of color signals Sc passing through optical filtering elements 120 in different colors and obtained by a plurality of second photodiodes 140, and then converts the plurality of color signals Sc generated by the second photodiode 140 into a plurality of pieces of image information Ii, to form a color image.

In some embodiments, the second processing module 30 may be implemented by an image signal processor (ISP).

In some embodiments, the image capturing apparatus includes a processor 40 that is electrically connected to the first processing module 20 and the second processing module 30. The depth information Id generated by the first processing module 20 and the image information Ii generated by the second processing module 30 are separately transmitted to the processor 40. The processor 40 processes and integrates the depth information Id and the image information Ii, to generate a three-dimensional image of the photographed target T.

In some embodiments, the image capturing apparatus may be integrated into an electronic apparatus such as a mobile phone. When a user uses the electronic apparatus to perform photographing, the three-dimensional image of the photographed target T may be generated and displayed on a screen of the electronic apparatus. The processor 40 in the image capturing apparatus may be implemented by a processing module in the electronic apparatus.

In some other embodiments, the image capturing apparatus may be applied to an in-vehicle self-driving system. Specifically, the image capturing apparatus may obtain both image information Ii and depth information Id of an object around a vehicle by using the image sensor 10, so that a type of the surrounding object can be determined based on the image information Ii, and a distance between the vehicle and the object can be determined based on the depth information Id, to make a response in time when the object is detected and the distance is less than a value.

Base on the above, in some embodiments, when the image sensor 10 includes both the polarization element 110 and the optical filtering element 120, the image capturing apparatus including the image sensor 10 may obtain both the image information and the depth information Id of the photographed target T. In some embodiments, when the polarization element 110 and the optical filtering element 120 are disposed adjacent to each other, the image sensor 10 can obtain a better color signal Sc, thereby preventing the image information Ii from being affected by the image of the polarization element 110, and maintaining the integrity of the image pixel.

Certainly, the present invention may have many other embodiments. Without departing from the spirit and essence of the present invention, those skilled in the art may make various corresponding changes and modifications according to the present invention, but these corresponding changes and modifications should all fall within the protection scope of the claims attached to the present invention.

What is claimed is:

1. An image capturing apparatus, comprising a plurality of sensing modules, the sensing modules being arranged in an arrayed manner, and each of the sensing modules comprising:
a plurality of polarization elements, having polarization directions respectively, and the polarization directions of the polarization elements being different;
a plurality of optical filtering elements, adjacent to the polarization elements respectively, and each of the optical filtering elements allowing light with different wavelengths to pass through;
a plurality of first photodiodes, a quantity of the first photodiodes corresponding to a quantity of the polarization elements, and each of the first photodiodes having a first receive end aligned with each of the polarization elements and being configured to receive polarization light;
a plurality of second photodiodes, a quantity of the second photodiodes corresponding to a quantity of the optical filtering elements, and each of the second photodiodes having a second receive end aligned with each of the optical filtering elements;
a first processing module, electrically connected to the plurality of first photodiodes, and configured to:
obtain a plurality of polarization signals from the plurality of first photodiodes;
segment an image composed of the plurality of polarization signals, to distinguish between a foreground area and a background area in the image;
calculate a polarization feature of the foreground area and the background area separately:
obtain a normal vector of a surface of the foreground area based on the polarization feature; and
construct depth information of the foreground area based on the normal vector; and
a second processing module, electrically connected to the second photodiodes, and configured to analyze a plurality of color signals obtained by receiving color light by the second photodiodes, to obtain image information.

2. The image capturing apparatus according to claim 1, wherein the quantity of the polarization elements is four, and polarization angles of the polarization elements are 0°, 45°, 90°, and 135° respectively.

3. The image capturing apparatus according to claim 2, wherein the optical filtering elements comprise at least one red light optical filtering element, at least one green light optical filtering element, and at least one blue light optical filtering element.

4. The image capturing apparatus according to claim 3, wherein the optical filtering elements are arranged alternately with the polarization elements, respectively.

5. The image capturing apparatus according to claim 3, wherein the optical filtering elements are respectively located around the polarization elements.

6. The image capturing apparatus according to claim 1, wherein the sensing module further comprises a plurality of lenses, wherein each of the lenses is disposed on the other side of each of the polarization elements relative to each of the first photodiodes or on the other side of each of the optical filtering elements relative to each of the second photodiodes.

7. The image capturing apparatus according to claim 1, wherein the sensing module further comprises a plurality of bases, the first photodiodes and the second photodiodes are respectively disposed in the bases, the first receive end of each of the first photodiodes and the second receive end of each of the second photodiodes are exposed to each of the bases, the first photodiodes each have a first signal end relative to the first receive end, the second photodiode each have a second signal end relative to the second receive end, and the first signal end and the second signal end are respectively disposed in the base.

8. The image capturing apparatus according to claim 1, wherein each of the first photodiodes receives, by using the first receive end, polarization light passing through each of the polarization elements, and each of the second photodiodes receives, by using the second receive end, color light passing through each of the color optical filtering elements.

9. The image capturing apparatus according to claim 1, wherein light passes through each of the polarization elements from an exterior of the image sensor to form the polarization light.

10. The image capturing apparatus according to claim 1, wherein light passes through each of the optical filtering elements from an exterior of the image sensor to form the color light.

11. The image capturing apparatus according to claim 1, further comprising a processor, electrically connected to the first processing module and the second processing module, wherein the processor is configured to process the depth information and the image information to generate a three-dimensional image.

* * * * *